(12) United States Patent
Lin

(10) Patent No.: US 12,171,315 B2
(45) Date of Patent: Dec. 24, 2024

(54) TURNTABLE STRUCTURE AND ELECTRONIC PRODUCT PROTECTIVE CASE USING SAME

(71) Applicant: GUANGZHOU ROISKIN TECHNOLOGY COMPANY, Guangzhou (CN)

(72) Inventor: Yuying Lin, Guangzhou (CN)

(73) Assignee: GUANGZHOU ROISKIN TECHNOLOGY COMPANY, Guangzhou (CN)

( * ) Notice: Subject to any disclaimer, the term of this patent is extended or adjusted under 35 U.S.C. 154(b) by 0 days.

(21) Appl. No.: 18/738,015

(22) Filed: Jun. 9, 2024

(65) Prior Publication Data
US 2024/0324744 A1    Oct. 3, 2024

(30) Foreign Application Priority Data
May 10, 2024    (CN) .......................... 202421011068.5

(51) Int. Cl.
| | |
|---|---|
| *F16M 11/10* | (2006.01) |
| *A45C 11/24* | (2006.01) |
| *F16M 13/00* | (2006.01) |
| *F16M 13/04* | (2006.01) |
| *A45C 11/00* | (2006.01) |
| *G06F 1/16* | (2006.01) |

(52) U.S. Cl.
CPC ........... *A45C 11/24* (2013.01); *F16M 11/105* (2013.01); *F16M 13/005* (2013.01); *F16M 13/04* (2013.01); *A45C 2011/002* (2013.01); *G06F 1/1628* (2013.01)

(58) Field of Classification Search
CPC .... F16M 11/105; F16M 13/005; F16M 13/04; A45C 11/24
USPC .......................................................... 248/688
See application file for complete search history.

(56) References Cited

U.S. PATENT DOCUMENTS

| | | | |
|---|---|---|---|
| 11,265,035 B1* | 3/2022 | Zhang | F16M 11/105 |
| 11,832,712 B2* | 12/2023 | Carnevali | A45F 5/00 |
| 11,841,747 B2* | 12/2023 | Lin | G06F 1/1656 |
| 11,906,102 B2* | 2/2024 | Lin | F16M 11/105 |
| 11,940,090 B1* | 3/2024 | Sumida | F16M 13/04 |
| 2004/0119390 A1 | 6/2004 | Huang | |
| 2016/0051021 A1 | 2/2016 | Onda et al. | |
| 2018/0062688 A1 | 3/2018 | Wang et al. | |
| 2022/0417356 A1* | 12/2022 | Chiang | F16B 5/0621 |

* cited by examiner

*Primary Examiner* — Todd M Epps
(74) *Attorney, Agent, or Firm* — Hemisphere Law, PLLC; Zhigang Ma

(57) ABSTRACT

The present disclosure discloses a turntable structure and an electronic product protective case using the same. The turntable structure includes a base plate and a handheld ring arranged on an outer side of the base plate; one end of the handheld ring is hinged to the base plate; a first groove convenient for opening the handheld ring is arranged at the other end of the handheld ring; several clamping portions are arranged along an edge of the base plate at intervals; the clamping portions include recesses arranged along the edge of the base plate and buckling rods arranged in the recesses; one end of each buckling rod is fixedly connected to a side wall of each recess, and a protrusion is arranged at the other end of the buckling rod. The present disclosure belongs to the field of protective cases.

10 Claims, 8 Drawing Sheets

TURNTABLE STRUCTURE AND ELECTRONIC PRODUCT PROTECTIVE CASE USING SAME

TECHNICAL FIELD

The present disclosure belongs to the field of protective cases, and in particular, to a turntable structure and an electronic product protective case using same.

BACKGROUND

With the popularization of electronic products, people cannot do without the assistance of electronic products in their daily lives, such as watching movies, playing games, and ordering takeout. Therefore, use scenarios of the electronic products are complex and changeable. Furthermore, as people pay more and more attention to electronic products and use electronic products more and more frequently, functions of an electronic product protective case should also increase.

At present, most of the existing electronic product protective cases are provided with ferrules on back portions to prevent accidental slipping of electronic products. However, the entire ferrule device cannot be rotated, so a user needs to use the electronic product within a specified angle range. When a user intends to flip a screen or use the electronic product beyond the specified angle range, it is hard for the electronic product protective case to meet a traveling requirement of the user.

SUMMARY

The present disclosure mainly aims to provide a turntable structure and an electronic product protective case using same, to add use scenarios and enlarge an application range to meet a daily traveling requirement of a user.

In order to achieve the above objectives, the technical solutions of the present disclosure are as follows:

A turntable structure includes a base plate and a handheld ring arranged on an outer side of the base plate; one end of the handheld ring is hinged to the base plate; a first groove convenient for opening the handheld ring is arranged at the other end of the handheld ring; several clamping portions for fixing are arranged along an edge of the base plate at intervals; the clamping portions include recesses arranged along the edge of the base plate and buckling rods arranged in the recesses; one end of each buckling rod is fixedly connected to a side wall of each recess, and a protrusion is arranged at the other end of the buckling rod; and a rebound clearance for allowing the protrusion to swing is arranged between the buckling rods and the base plate.

In a specific embodiment of the present disclosure, a first gasket is arranged between the base plate and the handheld ring; and the first gasket is detachably connected to the base plate.

In a specific embodiment of the present disclosure, several second grooves configured to accommodate the clamping portions are arranged on one side, corresponding to the base plate, of the first gasket at intervals.

In a specific embodiment of the present disclosure, a first through hole is arranged at one end of the base plate; a connecting portion is arranged in the first through hole and the connecting portion includes a first rotating sheet and a second rotating sheet which are separately arranged on two sides of the first gasket.

In a specific embodiment of the present disclosure, second gaskets are separately arranged on one side of the first rotating sheet away from the first gasket and one side of the second rotating sheet away from the first gasket.

In a specific embodiment of the present disclosure, a second through hole convenient for carrying is further arranged in a center of the handheld ring.

In a specific embodiment of the present disclosure, a cambered surface convenient for sliding is arranged on one side of each protrusion away from the base plate.

In a specific embodiment of the present disclosure, an electronic product protective case includes the turntable structure, and further includes a protective shell, wherein the protective shell is provided with a mounting hole at a position corresponding to the base plate; and several first grooves configured to clamp the protrusions are arranged along an edge of the mounting hole at intervals.

In a specific embodiment of the present disclosure, when the base plate is rotated, the protrusions are shifted towards the rebound clearance under the action of a side wall of the mounting hole; and after the rotation of the base plate is completed, the protrusions rebound to initial positions and are clamped to the corresponding first grooves.

In a specific embodiment of the present disclosure, a limiting plate configured to limit movement of the base plate is arranged in the mounting hole.

One of the above technical solutions of the present disclosure at least has one of the following advantages or beneficial effects:

According to the present disclosure, the several clamping portions are arranged along the edge of the base plate at intervals; one end of each buckling rod is fixedly connected to the side wall of each recess, and the protrusion is arranged at the other end of the buckling rod; and the rebound clearance for allowing the protrusion to swing is arranged between the buckling rods and the base plate. Therefore, when a user needs to flip a screen or use an electronic product beyond a specific angle range, the user can rotate the base plate to shift the protrusion towards the rebound clearance to cooperate with the rotation. Meanwhile, after the rotation of the base plate is completed, the protrusion rebounds to an initial position for being locked, thereby adding use scenarios and enlarge an application range of the present disclosure to meet a daily traveling requirement of a user.

BRIEF DESCRIPTION OF THE DRAWINGS

The present disclosure will be further explained below in conjunction with the accompanying drawings and embodiments.

DETAILED DESCRIPTION OF THE EMBODIMENTS

The implementations of the present disclosure will be described in detail below, and examples of the implementations are shown in accompanying drawings, where the same or similar numerals throughout represent same or similar elements or elements with same or similar functions. The implementations described below with reference to the accompanying drawings are exemplary and used only for explaining the present disclosure, and should not be construed as a limitation on the present disclosure.

In the descriptions of the present disclosure, it should be understood that in terms of orientation descriptions, for example, orientations or positional relationships indicated by the terms "upper", "lower", "front", "rear", "left", "right", and the like are orientations or positional relationships based on the accompanying drawings, and are only for the purpose of facilitating and simplifying the descriptions of the present disclosure instead of indicating or implying that devices or elements indicated must have particular orientations, and be constructed and operated in the particular orientations, so that these terms are not construed as limiting the present disclosure.

In the descriptions of the present disclosure, the term several means one or more; plurality means two or more; greater than, less than, more than, and the like are understood as excluding the original number; and above, below, within, and the like are understood as including the original number. If there is a description of first and second, they are only for the purpose of distinguishing technical features, and cannot be understood as indicating or implying relative importance or implying the quantity or sequence of the indicated technical features.

In addition, the terms "first" and "second" are used for descriptive purposes only and are not to be construed as indicating or implying relative importance or to implicitly indicate the number of technical features indicated. Thus, features defined as "first" and "second" can explicitly or implicitly include one or more of the features.

In the description of the present disclosure, it should be noted that, unless otherwise expressly specified and defined, the term "connect" should be understood in a broad sense. For example, it can be a fixed connection or movable connection, a detachable connection or non-detachable connection, an integrated connection, a mechanical connection, an electrical connection, communication with one another, direct connection, indirect connection through an intermediate medium, an internal communication or internal indirect connection between two elements, or an interaction between two elements.

The following disclosure provides many different implementations or examples to implement different solutions of the present disclosure.

Figure 1:
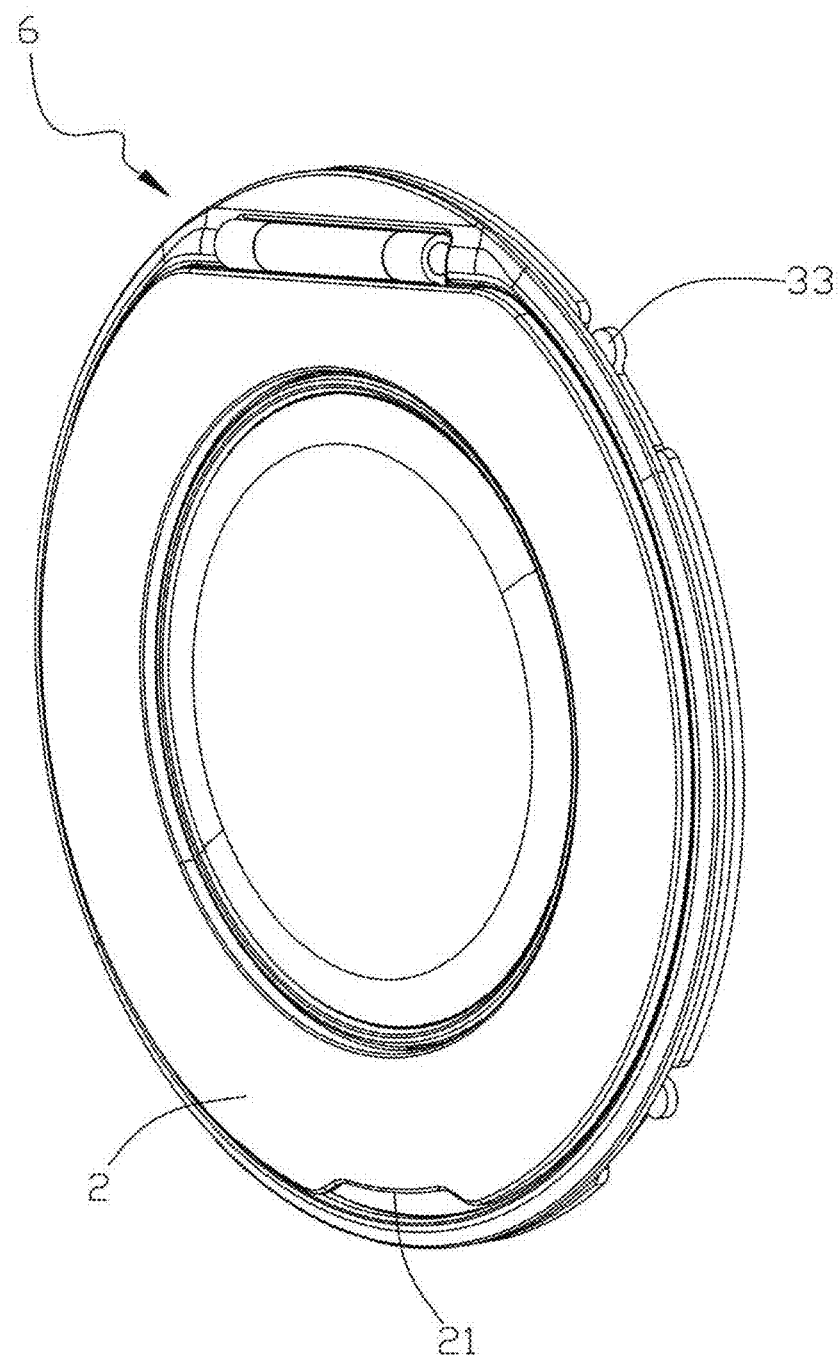
FIG. 1 is a diagram of a turntable structure according to an embodiment of the present disclosure.
Figure 2:
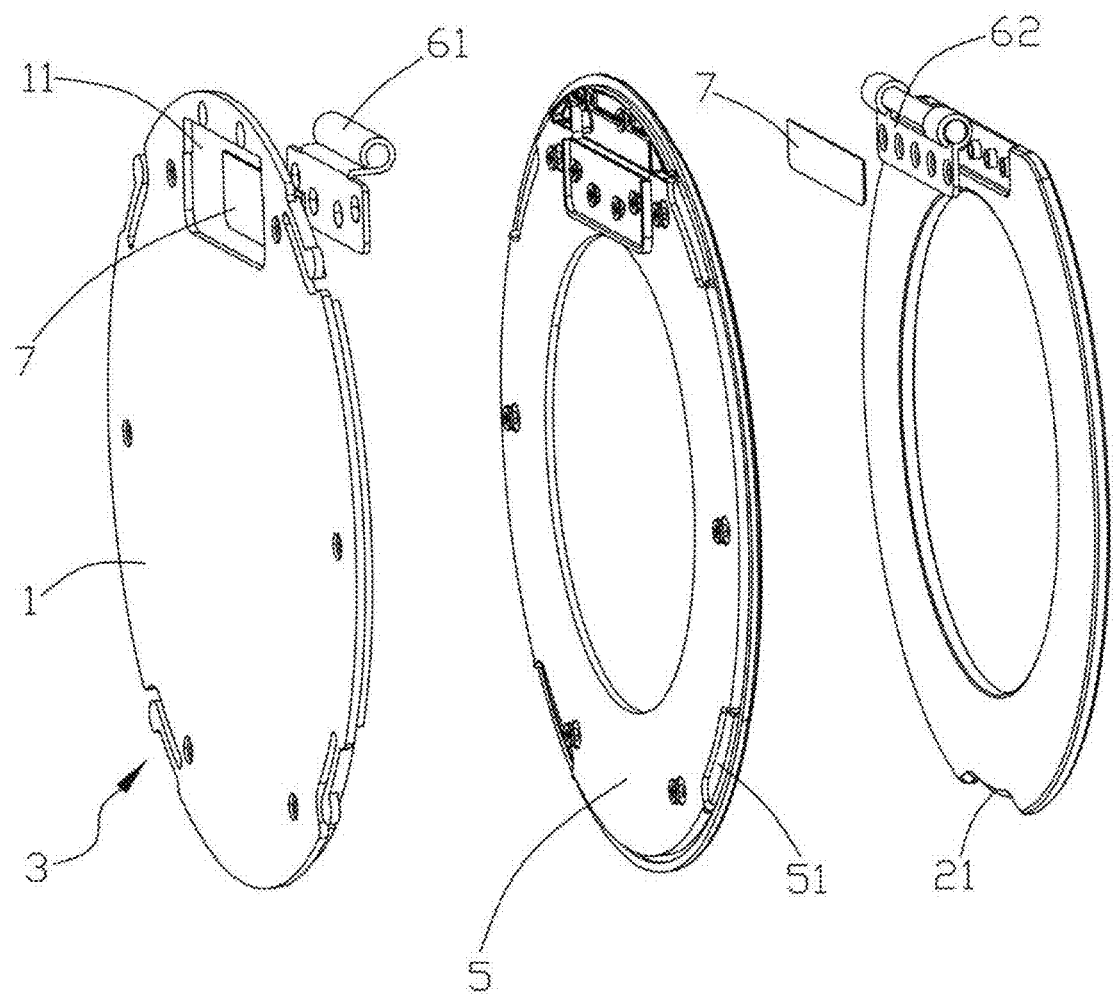
FIG. 2 is an exploded view of a turntable structure according to an embodiment of the present disclosure.
Figure 3:
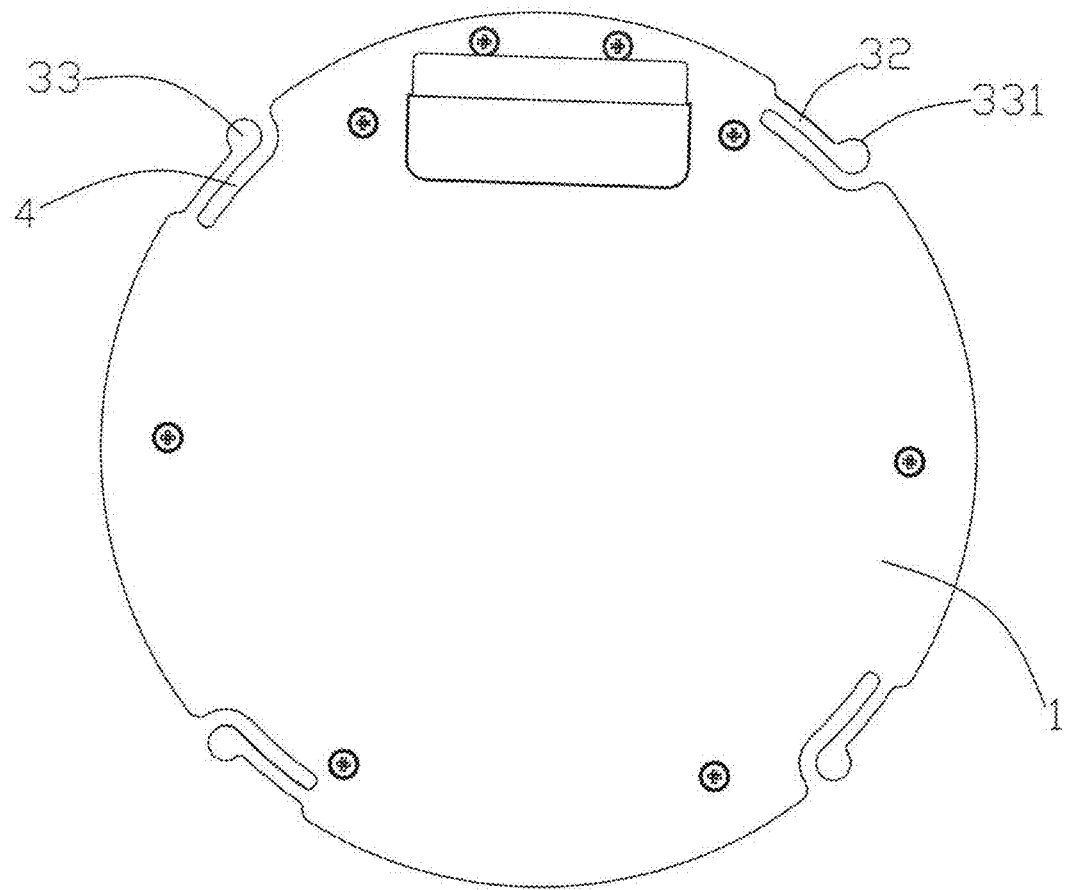
FIG. 3 is a rear view of a base plate according to an embodiment of the present disclosure.
Figure 4:
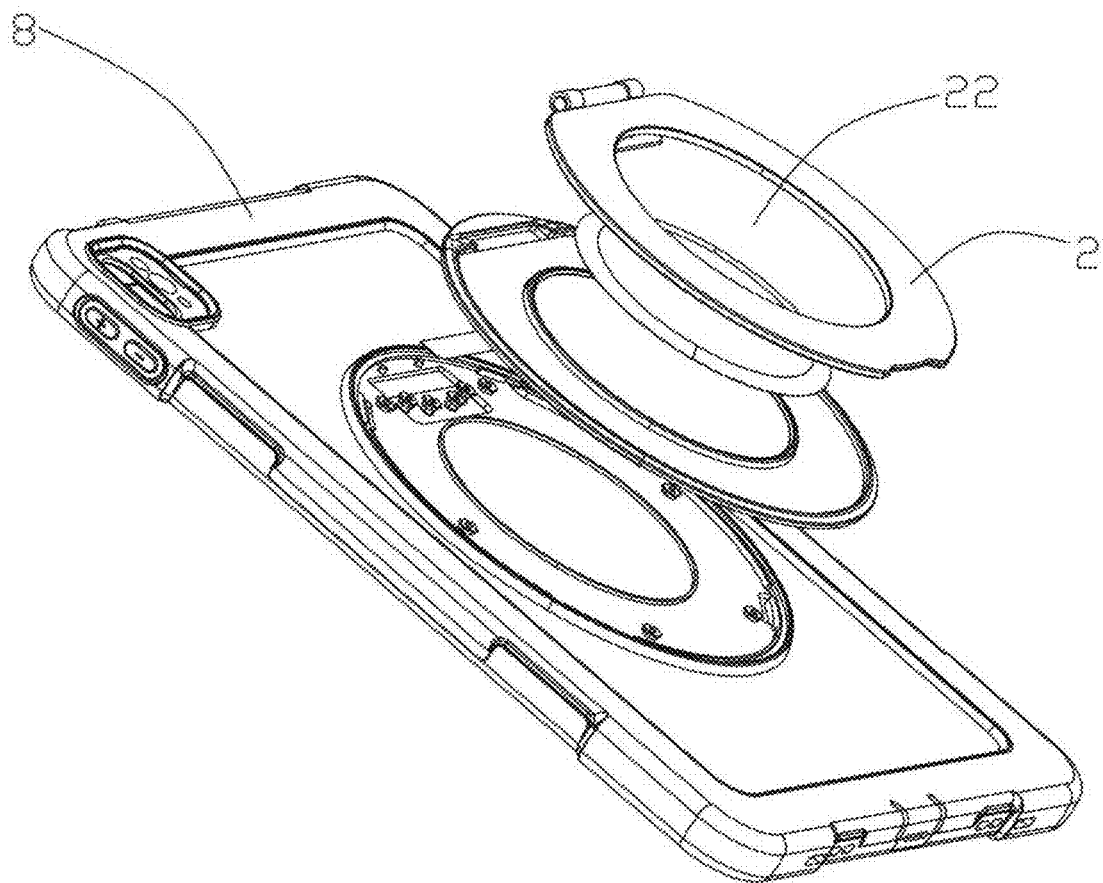
FIG. 4 is an overall exploded view of an electronic product protective case according to an embodiment of the present disclosure.
Figure 5:
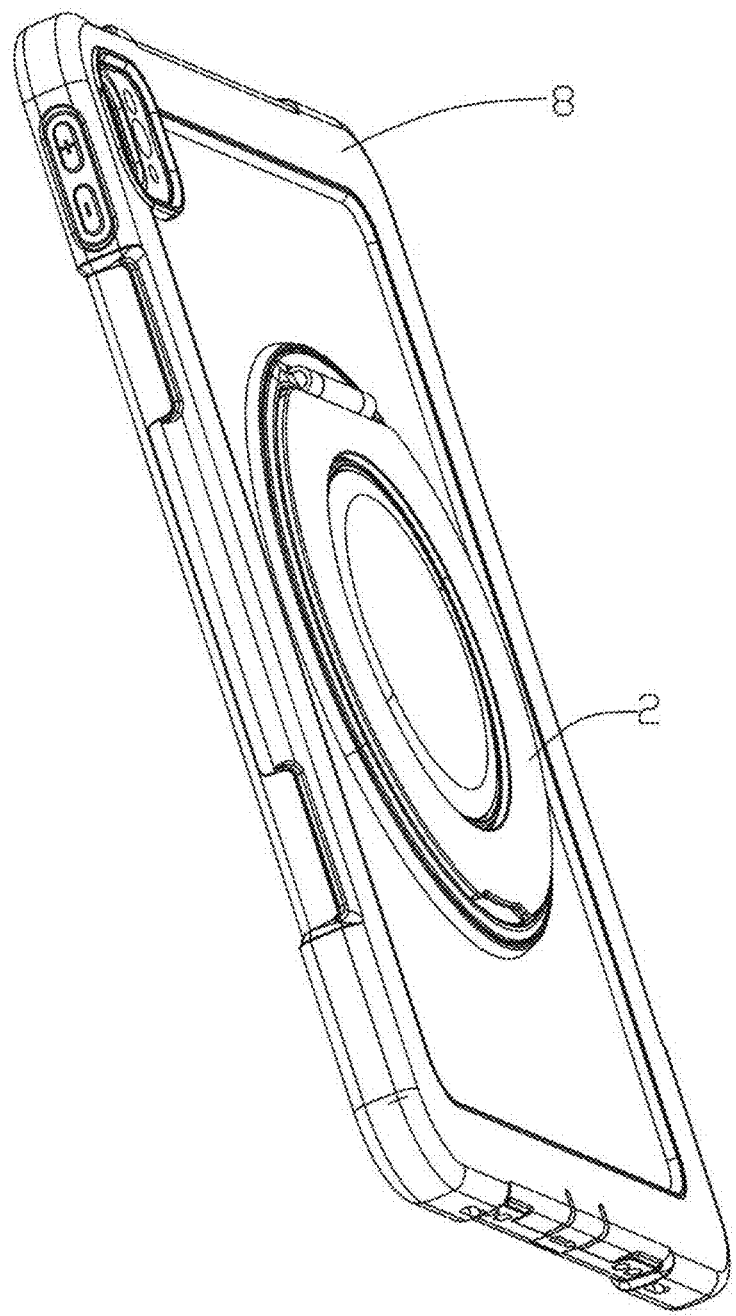
FIG. 5 is an overall structural diagram of an electronic product protective case according to an embodiment of the present disclosure.
Figure 6:
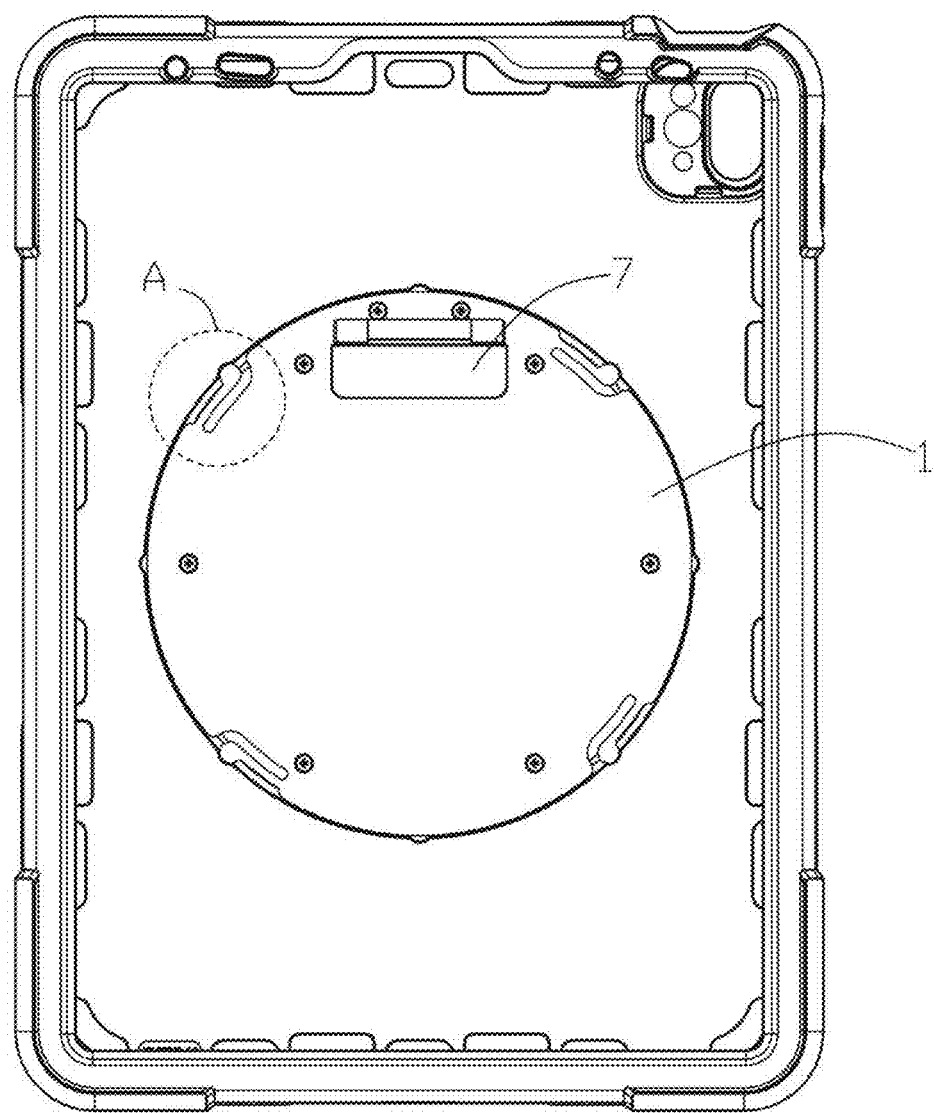
FIG. 6 is an overall rear view of an electronic product protective case according to an embodiment of the present disclosure.
Figure 7:
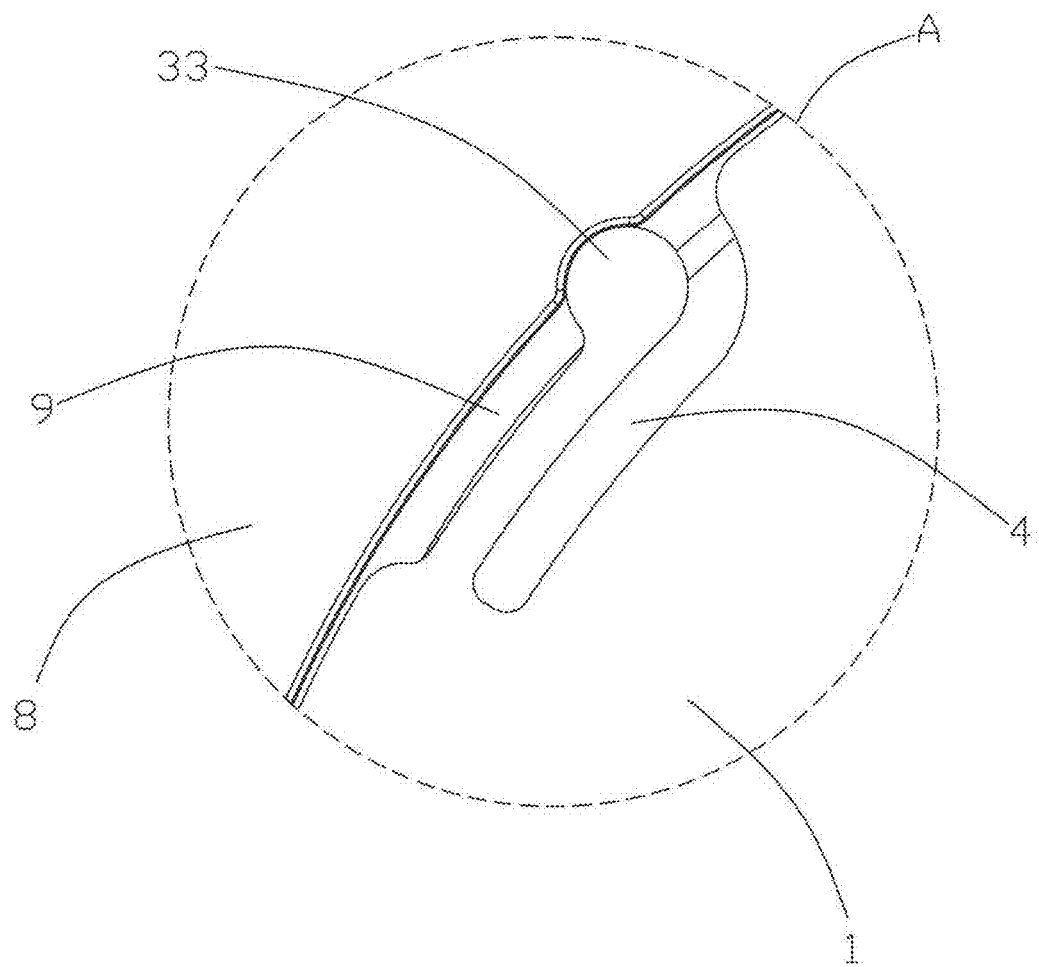
FIG. 7 is an enlarged view of part A according to an embodiment of the present disclosure.
Figure 8:
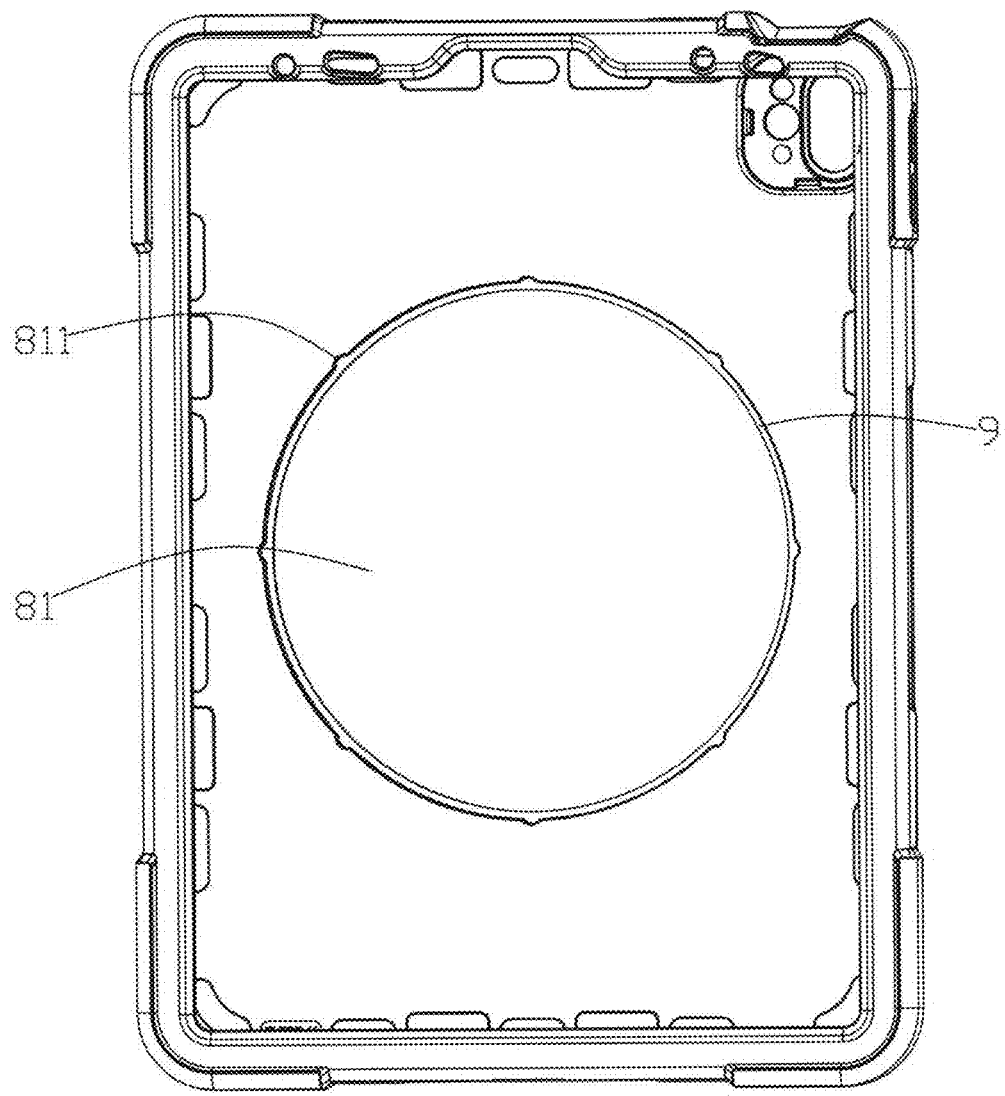
FIG. 8 is a rear view of a protective shell according to an embodiment of the present disclosure.

Referring to FIG. 1 to FIG. 8, a turnable structure and an electronic product protective case using the same are shown. The turntable structure includes a base plate 1, a handheld ring 2 arranged on an outer side of the base plate 1, and a protective shell 8. The protective shell 8 is a silica gel component, which can achieve drop resistance and an effect of protecting an electronic product inside. The protective shell 8 is provided with a mounting hole 81 at a position corresponding to the base plate 1. Four clamping portions 3 for fixing are arranged along an edge of the base plate 1 at intervals.

In an embodiment of the present disclosure, the clamping portions 3 include recesses arranged along the edge of the base plate 1 and buckling rods 32 arranged in the recesses; one end of each buckling rod 32 is fixedly connected to a side wall of each recess, and a protrusion 33 is arranged at the other end of the buckling rod 32; a rebound clearance 4 for allowing the protrusion 33 to swing is arranged between the buckling rods 32 and the base plate 1; and a cambered surface 331 convenient for sliding is arranged on one side of each protrusion 33 away from the base plate 1.

In an embodiment of the present disclosure, four first grooves 811 configured to clamp the protrusions 33 are arranged along an edge of the mounting hole 81. When the base plate 1 is rotated, the protrusions 33 can be shifted towards the rebound clearance 4 under the pressing action of a side wall of the mounting hole 81. After the rotation of the base plate 1 is completed, the protrusions 33 can rebound to initial positions under the action of the buckling rods 32 and are clamped with the corresponding first grooves 811 to complete fixing of the base plate 1. Therefore, use scenarios can be greatly added, and an application range can be significantly enlarged, so as to meet a daily traveling requirement of a user.

In an embodiment of the present disclosure, a limiting plate 9 configured to limit movement of the base plate 1 is arranged in the mounting hole 81. The limiting plate 9 can limit the base plate 1 in the mounting hole 81 to improve the stability of the overall structure and prevent accidental falling of the turntable structure.

In an embodiment of the present disclosure, one end of the handheld ring 2 is hinged to the base plate 1; and a first groove 21 convenient for opening the handheld ring 2 is arranged at the other end of the handheld ring 2. A second through hole 22 convenient for carrying is further arranged in a center of the handheld ring 2. A first gasket 5 is arranged between the base plate 1 and the handheld ring 2. The first gasket 5 is detachably connected to the base plate 1 through a screw, and the first gasket 5 and the base plate 1 are both polycarbonate (PC) components.

In an embodiment of the present disclosure, four second grooves 51 configured to accommodate the clamping portions 3 are arranged on one side, corresponding to the base plate 1, of the first gasket 5 at intervals. The second grooves 51 can allow the buckling rods 32 to drive the protrusions 33 to swing under the pressing action of the side wall of the mounting hole 81.

In an embodiment of the present disclosure, a first through hole 11 is arranged at one end of the base plate 1; a connecting portion 6 for hinging the handheld ring 2 to the base plate 1 is arranged in the first through hole 11; the connecting portion 6 includes a first rotating sheet 61 and a second rotating sheet 62 which are separately arranged on two sides of the first gasket 5. Second gaskets 7 are separately arranged on one side of the first rotating sheet 61 away from the first gasket 5 and one side of the second rotating sheet 62 away from the first gasket 5. When the handheld ring 2 is opened under the action of the connecting portion 6, a sense of damping may be caused, so that the handheld ring 2 is located to an angle required by a user. Furthermore, when the handheld ring 2 is closed, the handheld ring 2 is folded to an angle range and can be automatically reset, thereby achieving a locked state.

In an embodiment of the present disclosure, the first rotating sheet 61 is arranged between the base plate 1 and the first gasket 5, and a lower half portion of the first rotating sheet 61 is fixedly connected to the first gasket 5; a lower half portion of the second rotating sheet 62 is riveted to the handheld ring 2; the first rotating sheet 61 is connected to an upper half portion of the second rotating sheet 62 through a rotating rod, so that the first rotating sheet 61 and the second rotating sheet 62 form a rotatable hinge structure; furthermore, the rotation range is from 0 to 180°, so that a rotation range between the handheld ring 2 and the base plate 1 can be maintained at 0 to 180°; and meanwhile, after the handheld ring 2 is opened, the handheld ring can cooperate with the base plate 1 and the first gasket 5 to achieve a collaborative supporting effect.

One of use steps of the turntable structure and the electronic product protective case using same include: Firstly, the handheld ring 2 can be opened through the first groove 21; the base plate 1 is then rotated to a desired position; the protrusions 33 rebound to the initial positions under the action of the buckling rods 32 and are clamped to the corresponding first grooves 811; and after the fixing is completed, the handheld ring 2 is adjusted to an appropriate opening and closing angle, so that an electronic product can be carried with a hand through the second through hole 22 or is supported on a tabletop to meet a requirement for landscape viewing or viewing in another angle.

Although the implementations of the present disclosure have been shown and described, it can be understood by those of ordinary skill in the art that various changes, modifications, substitutions, and transformations can be made to these implementations without departing from the principle and purpose of the present disclosure. The scope of the present disclosure is defined by the claims and their equivalents.

What is claimed is:

1. A turntable structure, comprising a base plate (1) and a handheld ring (2) arranged on an outer side of the base plate (1); one end of the handheld ring (2) is hinged to the base plate (1); a first groove (21) convenient for opening the handheld ring (2) is arranged at an opposite end of the handheld ring (2); several clamping portions (3) for fixing are arranged along an edge of the base plate (1) at intervals; the clamping portions (3) comprise recesses arranged along the edge of the base plate (1) and buckling rods (32) arranged in the recesses; one end of each buckling rod (32) is fixedly connected to a side wall of each recess, and a protrusion (33) is arranged at an opposite end of the buckling rod (32); and a rebound clearance (4) for allowing the protrusion (33) to swing is arranged between the buckling rods (32) and the base plate (1).

2. The turntable structure according to claim 1, wherein a first gasket (5) is arranged between the base plate (1) and the handheld ring (2); and the first gasket (5) is detachably connected to the base plate (1).

3. The turntable structure according to claim 2, wherein several second grooves (51) configured to accommodate the clamping portions (3) are arranged on one side, corresponding to the base plate (1), of the first gasket (5) at intervals.

4. The turntable structure according to claim 2, wherein a first through hole (11) is arranged at one end of the base plate (1); a connecting portion (6) is arranged in the first through hole (11); and the connecting portion (6) comprises a first rotating sheet (61) and a second rotating sheet (62) which are separately arranged on two sides of the first gasket (5).

5. The turntable structure according to claim 4, wherein second gaskets (7) are separately arranged on one side of the first rotating sheet (61) away from the first gasket (5) and one side of the second rotating sheet (62) away from the first gasket (5).

6. The turntable structure according to claim 1, wherein a second through hole (22) convenient for carrying is further arranged in a center of the handheld ring (2).

7. The turntable structure according to claim 1, wherein a cambered surface (331) convenient for sliding is arranged on one side of each protrusion (33) away from the base plate (1).

8. An electronic product protective case, comprising the turntable structure according to claim 1, and further comprising a protective shell (8), wherein the protective shell (8) is provided with a mounting hole (81) at a position corresponding to the base plate (1); and several first grooves (811) configured to clamp the protrusions (33) are arranged along an edge of the mounting hole (81) at intervals.

9. The electronic product protective case according to claim 8, wherein when the base plate (1) is rotated, the protrusions (33) are shifted towards the rebound clearance (4) under the action of a side wall of the mounting hole (81); and after the rotation of the base plate (1) is completed, the protrusions (33) rebound to initial positions and are clamped to the corresponding first grooves (811).

10. The electronic product protective case according to claim 9, wherein a limiting plate (9) configured to limit movement of the base plate (1) is arranged in the mounting hole (81).

* * * * *